US011362746B2

(12) United States Patent
Nehls et al.

(10) Patent No.: US 11,362,746 B2
(45) Date of Patent: Jun. 14, 2022

(54) EFFICIENT NEAR-FIELD COMMUNICATION BASED ON AUDIO SIGNALS

(71) Applicant: SONOBEACON GMBH, Schwerin (DE)

(72) Inventors: Thoralf Nehls, Jesteburg (DE); Peter Wackerbauer, Pettendorf (DE); Hubertus Maschek, Bad Worishofen (DE)

(73) Assignee: SONOBEACON GMBH, Hamburg (DE)

(*) Notice: Subject to any disclaimer, the term of this patent is extended or adjusted under 35 U.S.C. 154(b) by 179 days.

(21) Appl. No.: 16/772,573

(22) PCT Filed: Dec. 13, 2017

(86) PCT No.: PCT/EP2017/082646
§ 371 (c)(1),
(2) Date: Jun. 12, 2020

(87) PCT Pub. No.: WO2019/114950
PCT Pub. Date: Jun. 20, 2019

(65) Prior Publication Data
US 2021/0083786 A1    Mar. 18, 2021

(51) Int. Cl.
*H04H 20/42*     (2008.01)
*H04W 4/80*      (2018.01)
(Continued)

(52) U.S. Cl.
CPC ......... *H04H 20/426* (2013.01); *G10L 19/018* (2013.01); *H04H 20/86* (2013.01); *H04W 4/80* (2018.02); *H04H 2201/50* (2013.01)

(58) Field of Classification Search
CPC .. H04H 20/426; H04H 20/86; H04H 2201/50; H04H 20/31; G10L 19/018;
(Continued)

(56) References Cited

U.S. PATENT DOCUMENTS 9,264,151 B1    2/2016  Emigh et al.
2014/0056172 A1*  2/2014 Lee .................. H04M 1/72412
                                                370/254
2014/0160880 A1   6/2014  King et al.

OTHER PUBLICATIONS

Chinese Office Action for corresponding Chinese Patent Application No. 201780097689.6 dated Aug. 4, 2021, 10 pages.
(Continued)

*Primary Examiner* — Shaima Q Aminzay
(74) *Attorney, Agent, or Firm* — Lee & Hayes, P.C.

(57) ABSTRACT

The present disclosure describes an efficient computer-implemented near-field communication system and method based on broadcasting audio signals for dynamically providing context-related additional content to a mobile device. In embodiments of the present invention, the additional content is mapped to specific audio watermarks and/or triggering commands which are encoded together into a digital signal. Based on continuously scanning the received background noise, an exactly defined frequency range and volume is dynamically selected for broadcasting the signal. Hence, the encoded digital signal is further modulated into an audio signal in the exactly defined frequency range. In embodiments of the present invention, the selected exactly defined frequency range for transmitting the audio signal may preferably be located in the ultrasound and/or infra-sound frequency range. In case of transmitting infrasound signals, gyrosensors of the mobile device may be employed as audio signal receivers in embodiments of the present invention. Moreover, in further embodiments of the present invention, audio signal receiver of a mobile device such as
(Continued)

gyrosensors or microphones may be switched on by transmitting a command via a wireless network such as Wifi or Bluetooth. Also the information about the selected frequency range and volume for broadcasting the audio signal may be provided to the mobile device via a wireless network in embodiments of the present invention. In response, an audio signal receiver of the mobile device may be tuned to the selected frequency range. The received audio signal is further processed on the mobile device so that the context-related additional content may be displayed and/or rendered.

16 Claims, 6 Drawing Sheets

(51) Int. Cl.
*G10L 19/018* (2013.01)
*H04H 20/86* (2008.01)

(58) Field of Classification Search
CPC ....... H04W 4/80; H04W 4/021; H04W 4/024; H04W 4/33; H04B 11/00; H04R 29/007; H04R 2227/003; H04R 2227/005; H04R 2227/007
USPC ........................................................ 455/3.06
See application file for complete search history.

(56) References Cited

OTHER PUBLICATIONS

PCT Search Report for International Application No. PCT/EP2017/082646 dated Sep. 13, 2018, 3 pages.

\* cited by examiner

EFFICIENT NEAR-FIELD COMMUNICATION BASED ON AUDIO SIGNALS

TECHNICAL FIELD

The present disclosure relates to methods and systems for dynamically providing context-related additional content to mobile devices by broadcasting audio signals.

BACKGROUND

Near-field communication based on sending and receiving encoded acoustic audio signals in both the audible and the inaudible frequency range for providing additional, customized content has been used in the art for a while now. In said method, audio signals comprising an audio watermark which unambiguously identifies a piece of content are broadcasted to mobile devices located in direct vicinity. The mobile devices receive said audio signals via their microphones and are further able to retrieve the additional information from a database located on a server based on identifying the audio watermark. It is pointed out that throughout this description, the term "audio signal" is used in its specific meaning of "acoustic audio signal".

Especially vendors and service providers have taken advantage of this method of communication with customers being physically present and thus being able to provide them with up-to-date information and customized offers taking into account the customers' specific context. Moreover, audio signals captured by the microphone of a mobile device from the ambient environment have also been used to enhance the accuracy of indoor navigation, since satellite-based navigation systems such as GPS generally do not work well in indoor environments.

However, the process of demodulating the complex protocol of a received encoded and modulated audio signal on a mobile device consumes a large number of computing resources. Hence, it would be desirable to initiate said resource-intensive process of demodulating an audio signal merely for those received audio signals which actually contain audio watermarks. Misdetections of audio signals which do not comprise any audio watermarks as they e.g. form part of the background noise present in the respective environment around a mobile device should be avoided in order to save the battery resources of a mobile device and thus to extend its overall lifetime. Likewise, in prior art systems, a lot of battery power is consumed by the numerous sensors such as e.g. the audio signal receivers of a mobile device waiting to detect an audio signal comprising an audio watermark. Further, also the process of generating and broadcasting audio signals needs a lot of energy.

Moreover, most near-field communication systems based on audio signals described in the prior art are limited to a rather small local range around an audio signal transmitter. However, in some situations, it might be preferable to be able to receive an audio signal by a mobile device which is located further away from an audio signal transmitter and/or located in areas shielded by obstacles such as walls.

Hence, it is the object of the present invention to provide systems and methods enabling near-field communication based on audio signals in an efficient way.

This object is solved by the subject matter of the independent claims. Preferred embodiments are defined by the dependent claims.

SUMMARY

In the following, a summary is provided to introduce a selection of representative concepts in a simplified form that are further described below in the detailed description. This summary is not intended to identify key features or essential features of the claimed subject matter, nor is it intended to be used in any way that would limit the scope of the appended claims.

Briefly, the subject matter of the present invention is directed towards a computer-implemented method for dynamically providing context-related additional content to a mobile device by broadcasting audio signals by a computing device. Hereby, the additional content is provided in a database or in databases on a server device which comprises look-up tables of audio watermarks mapped to specific context-related content and look-up tables for triggering commands mapped to specific context-related events. A computing device configured to broadcast an audio signal to mobile devices located in its vicinity accesses said database via a wireless network and extracts a specific watermark and/or triggering command.

In a next step, said specific watermark and/or triggering command are encoded into a digital signal using error correcting encoding. In order to further enhance security, in embodiments of the present invention, a bit length corresponding to the data part of the signal and a bit length corresponding to the key shared between the broadcasting computing device and the receiving mobile device are configured to change dynamically. Moreover, in further embodiments, also the mapping of each specific piece of content to a specific watermark and/or of each specific event to a triggering command is configured to change automatically on a regular basis.

Subsequently, in a first method of the present invention, an exactly defined frequency range which is least hampered by background noise present in the environment surrounding a broadcasting computing device is selected by continuously scanning received audio signals. Additionally, also the volume of the audio signal to be broadcasted may be selected to be so high that the audio signal is very well detectable at an audio signal receiver of a mobile device located in the vicinity of the broadcasting computing device.

Based on the selected frequency range and possibly volume, the encoded digital signal is further modulated into an audio signal in the selected exactly defined frequency range using modulation schemes such as for example quadrature amplitude modulation (QAM). In embodiments of the present invention, the selected exactly defined frequency range for transmitting the audio signal may preferably be located in the ultrasound and/or infrasound frequency range. However, in embodiments of the invention, the audio signal may also be broadcasted in the audible frequency range.

Subsequently, in an embodiment of the present invention, it is further feasible to switch on a previously switched off audio signal receiver of the mobile device such as a microphone by transmitting a command from the computing device to the mobile device via a wireless network. Hereby, in embodiments of the present invention, the wireless network may be a WIFI network or a Bluetooth network.

Moreover, also using the wireless network, a further command may be transmitted to the mobile device comprising information about the selected exactly defined frequency range and the volume of the audio signal to be broadcasted. In further embodiments of the present invention, said information may also be transmitted by an acoustic broadband signal, when an audio signal receiver such as a microphone of the mobile device is already switched on.

Once said command to switch on an audio signal receiver of the mobile device and/or said information about the selected exactly defined frequency range and volume are received by the mobile device, the audio signal receiver of the mobile device is switched on and subsequently tuned to the selected frequency range.

In embodiments of the present invention, an audio signal receiver of a mobile device further or alternatively has to receive a triggering signal within a selected exactly defined frequency range before the signal processing component eventually begins the very resource-intensive process of demodulating the complex QAM or comparable protocol of an encoded and modulated audio signal transmitting the additional context-related content.

Then, in a next step of a first method of the present invention, an audio signal is broadcasted by the audio signal transmitter of the computing device and received by the audio signal receiver of the mobile device. Said received audio signal is further demodulated and decoded in order to derive the specific watermark and/or triggering command.

Moreover, in a first method of the present invention, the database on the server device is searched in order to determine the specific content and/or specific event related to the derived specific watermark and/or triggering command. Finally, said specific content and/or specific event is displayed and/or rendered on the mobile device.

In a second method of the present invention, context-related additional content may be provided to a mobile device by broadcasting audio signals merely in the infrasound frequency range. As in the first method described above, also in this second method a database or databases on a server device providing additional content, in which each specific piece of content is mapped to a specific watermark and/or a specific event is mapped to a triggering command, is accessed via a wireless network and a specific watermark and/or triggering command is extracted in a first step.

Then, said specific watermark and/or triggering command are encoded into a digital signal in the same way as described above with respect to the first method of the present invention. Said digital signal is further modulated into an audio signal in the infrasound frequency range using modulation schemes such as those mentioned above for the first method of the present invention.

In a next step of said second method of the present invention, a command to switch on a gyrosensor of the mobile device is transmitted via a wireless network. When said command is received by the mobile device, said gyrosensor of the mobile device is switched on so that it is able to receive a broadcasted infrasound signal.

As described above with respect to the first method of the present invention, also in said second method of the present invention said received infrasound audio signal subsequently is demodulated and decoded in order to derive the specific watermark and/or triggering command. Finally, in said second method of the present invention, the database is searched in order to determine the specific content and/or specific event related to the derived specific watermark and/or triggering command. Said specific content and/or specific event is then displayed and/or rendered on the mobile device.

In further embodiments, said first and said second method of the present invention may also be performed in the reverse direction. Hence, context-related additional content may also be provided from a mobile device to a computing device by broadcasting audio signals.

In embodiments of the present invention, the computing device and the mobile device may also be equipped with at least one of global navigation satellite system receivers and optical sensors.

Moreover, in both the first and second method of the present invention, a triggering command may be extracted on the mobile device from the received audio signal which triggers retrieving all relevant context-related additional content from the database. Then, all said retrieved relevant context-related additional content may be cached on the mobile device. Hence, in said embodiment, it is further sufficient to track the location of the mobile device to be able to display and/or render the appropriate context-related additional content on the mobile device.

In further embodiments of the present invention, a same watermark may be encoded together with different triggering commands triggering different specific events occurring while a similar context-related content is displayed or rendered on a mobile device. Similarly, a same triggering command may be encoded together with different watermarks leading to a similar or same event to be triggered together with completely different context-related content being displayed or rendered on a mobile device.

In all of the described different embodiments of the present invention, additionally user-specific parameters such as user profiles may be taken into account when providing context-related content.

In further aspects, a computer-readable medium is provided that has thereon stored computer-readable instructions that, when run on a computer, are configured for performing the steps of any of the methods described above.

In addition, a computer-implemented system is provided in the present invention for dynamically providing context-related additional content from a computing device to a mobile device by broadcasting audio signals by the computing device. Said system comprises a database or databases on a server device providing the context-related additional content, in which each specific piece of content is mapped to a specific watermark and/or a specific event is mapped to a triggering command. In aspects of the present invention, the computing device comprises at least a software component accessing the database via a wireless network and extracting a specific watermark and/or triggering command, a signal processing component performing the steps of encoding said specific watermark and/or triggering command into a digital signal, selecting an exactly defined frequency range and a volume based on continuously scanning noise signals present in the surrounding environment and using modulation schemes to modulate said digital signal into an audio signal in the selected exactly defined frequency range and an audio signal transmitter configured to broadcast said audio signal. In further aspects of the present invention, the system contains a wireless network connecting the computing device, the mobile device and the server device which is configured for accessing the database and for transmitting a command to switch on an audio signal receiver of the mobile device and for transmitting information about the selected frequency range and volume from the computing device to the mobile device. Moreover, in aspects of the present invention, the mobile device of the computer-implemented system comprises at least an audio signal receiver configured to receive said audio signal broadcasted by the audio signal transmitter of the computing device, a signal processing component configured to perform the steps of tuning the audio signal receiver to the selected frequency range and demodulating and decoding said received audio signal in order to derive the specific watermark and/or triggering command. Further, an application on the mobile device is configured to perform the steps of searching the database in order to determine the specific content and/or specific event related to the derived specific watermark and/or triggering command and displaying and/or rendering said specific content and/or specific event on a display of the mobile device.

In a further embodiment of the present invention, another computer-implemented system for dynamically providing context-related additional content from a computing device to a mobile device by broadcasting audio signals in the infrasound frequency range is provided. Said computer-implemented system of said further embodiment of the present invention comprises a database or databases on a server device providing the context-related additional content, in which each specific piece of content is mapped to a specific watermark and/or a specific event is mapped to a triggering command. The computing device of said another computer-implemented system of the present invention comprises at least a software component accessing the database via a wireless network and extracting a specific watermark and/or triggering command, a signal processing component performing the steps of encoding said specific watermark and/or triggering command together into a digital signal, and using modulation schemes to modulate said digital signal into an audio signal in the infrasound frequency range and an audio signal transmitter configured to broadcast said audio signal in the infrasound frequency range. Moreover, said another computer-implemented system of the present invention comprises a wireless network connecting the computing device, the mobile device and the server device and which is configured for accessing the database and for transmitting a command to switch on a gyrosensor of the mobile device. Finally, the mobile device of the another computer-implemented system of the present invention comprises at least a gyrosensor configured to receive said infrasound audio signal broadcasted by the audio signal transmitter of the computing device, a signal processing component configured to perform the steps of demodulating and decoding said received audio signal in order to derive the specific watermark and/or triggering command and an application configured to search the database in order to determine the specific content and/or specific event related to the derived specific watermark and/or triggering command and to display and/or render said specific content and/or specific event on a display of the mobile device.

Other advantages may become apparent from the following detailed description when taken in conjunction with the drawings.

DETAILED DESCRIPTION

Figure 1:
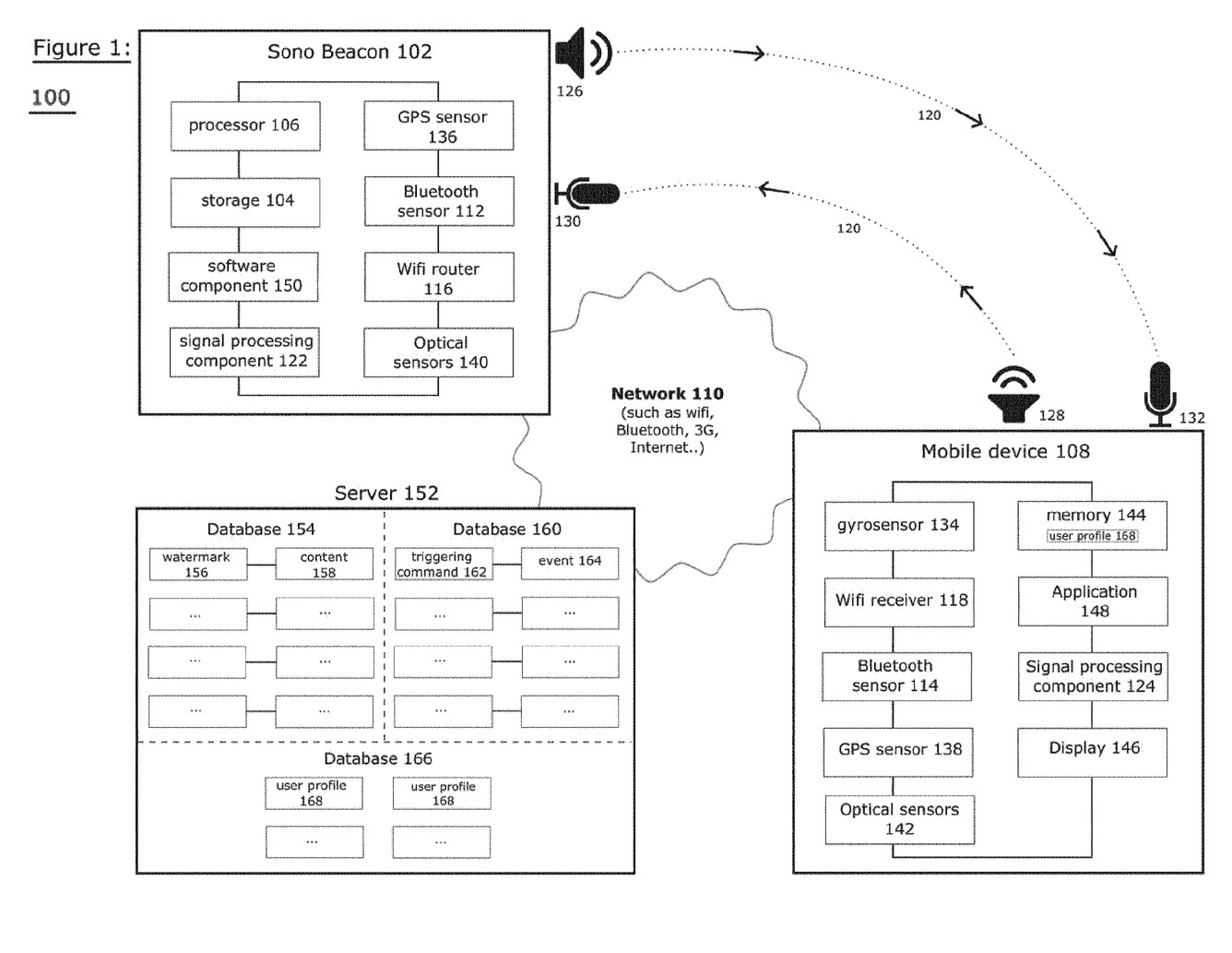
FIG. 1 is a block diagram that shows the components of a system for dynamically providing context-related additional content to a mobile device by broadcasting audio signals by a computing device according to embodiments of the present invention.

FIG. 1 shows an example implementation 100 of an unique audio identifier synchronization system for providing context-related additional content. Said unique audio identifier synchronization system comprises at least a SonoBeacon device 102 according to the present invention, which is a general computing device including components for data storing 104 and data processing 106, and a mobile device 108 such as a smartphone, a tablet, a PDA, a handheld computer, a smartwatch etc. However, these devices rather serve as illustrative examples of mobile devices and also additional and/or further devices may be used in the unique audio identifier synchronization system of the present invention. The SonoBeacon device 102 and the mobile device 108 are connected by a network 110 such as for example the Internet, LAN, WIFI, Bluetooth etc. Therefore, both the SonoBeacon device 102 and the mobile device 108 may be Bluetooth enabled devices and thus both comprise Bluetooth sensors 112, 114 and the SonoBeacon device 102 may also include a WIFI router 116 providing a WIFI to which a mobile device 108 may connect via a WIFI receiver 118.

At the same time, communication between the SonoBeacon device 102 and the mobile device 108 can be performed by sound signals 120 in any of the audible range, the ultrasound range and/or the infrasound range. In order to be able to communicate between each other by sound signals 120, both the SonoBeacon device 102 and the mobile device 108 are equipped with signal processing components 122, 124 whose details will be further discussed later with respect to FIGS. 2 and 3. Said signal processing components 122, 124 are configured to generate an encoded, modulated audio signal from one or more digital signatures and signals and are also configured to extract a digital signal and/or signature from an encoded, modulated audio signal.

Moreover, both the SonoBeacon device 102 and the mobile device 108 include audio signal transmitters 126, 128 such as, e.g., loudspeakers, and audio signal receivers 130, 132 such as, e.g., microphones. Additionally, for receiving sound signals in the infrasound range, also gyrosensors 134 of the mobile device 108 may be utilized. Hereby, the audio signal transmitters 126, 128 and audio signal receivers 130, 132 may be separate devices or may be combined to form a single device. In another embodiment, the audio signal transmitters 126, 128 and/or the audio signal receivers 130, 132 may also be combined with the signal processing components 122, 124 into a single device.

Both the SonoBeacon device 102 and the mobile device 108 may act as global navigation satellite system receivers and hence comprise equipment 136, 138 for receiving signals from satellite systems such as GPS, Galileo, GLONASS, Beidou etc. Further, both the SonoBeacon device 102 and the mobile device 108 may include additional sensors such as for example optical sensors 140, 142.

The mobile device 108 further comprises a memory 144 for storing data as well as a display 146 for displaying all kinds of graphic and multimedia content. A prerequisite for the functioning of the audio identifier synchronization system of the present invention for providing additional, customized, context-related content to a mobile device 108 is an installed SonoBeacon Application 148 on the mobile device 108 and a corresponding SonoBeacon software component 150 on the SonoBeacon device 102.

The additional, customized, context-related content to be provided to a user of a mobile device 108 is originally stored on a server device 152. Said server device 152 may be a separate entity which may be accessed from the SonoBeacon device 102 and from the mobile device 108 through the network 110. Alternatively, the server device 152 may be also part of the SonoBeacon device 102 and/or of the SonoBeacon Application 148 on the mobile device 108. The server device 152 may comprise a database 154 of look-up tables of audio watermarks 156 mapped to specific context-related content 158 and a database 160 of look-up tables for triggering commands 162 mapped to specific context-related events 164 to occur. Such events 164 may disclose for example an acoustic signal, an optical signal, a pop-up notice, etc. Said databases 154, 160 of audio watermarks 156 and of triggering commands 162 may be separate databases, split up into several databases or may alternatively be combined to form one single lookup database including a mapping of audio watermarks 156 to specific context-related content 158 and of triggering commands 162 to specific context-related events 164. It is important that said look-up tables of audio watermarks 156 and of triggering commands 162 may be accessed by both the SonoBeacon device 102 and by the mobile device 108, respectively. The server device 152 may additionally comprise a database 166 storing a plurality of user profiles 168 of users of the SonoBeacon Application 148. Alternatively, the user profile 168 of an individual SonoBeacon Application 148 user may also be stored locally on a user's mobile device 108.

Figure 2:
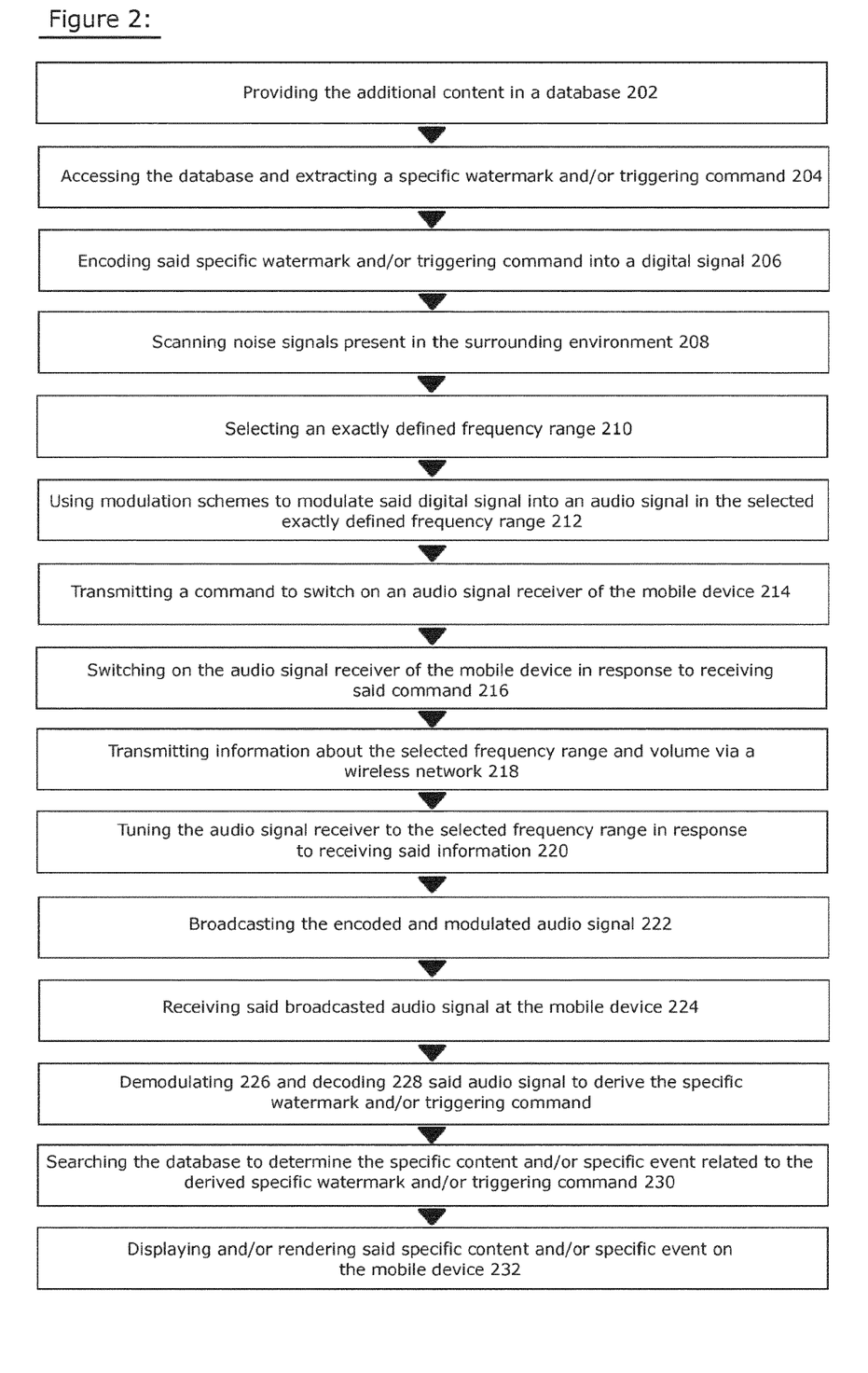
FIG. 2 is a flow diagram that illustrates a method for dynamically providing context-related additional content to a mobile device by broadcasting audio signals by a computing device, according to one embodiment of the present invention.

Referring to FIG. 2, a method for dynamically providing context-related additional content 158 to a mobile device 108 by broadcasting audio signals 120 using a computing device 102 such as the SonoBeacon device 102 is discussed. The method may also be performed in the opposite direction, i.e. the mobile device 108 may also provide context-related additional content 158 to a computing device 102 such as, e.g., the SonoBeacon device 102 by broadcasting audio signals 120.

First of all, the case of an audio signal 120 being generated at a computing device 102 such as for example the SonoBeacon device 102 is illustrated. In a first step, the SonoBeacon software component 150 of the SonoBeacon device 102 accesses 204 the databases 154, 160 of audio watermarks 156 and/or triggering commands 162, which can be either stored locally on the SonoBeacon device 102 or may be stored on a separate server 152. In the case that said databases 154, 160 are maintained on a separate server device 152, the SonoBeacon device 102 accesses them over a network 110 such as the internet or Bluetooth. The content of said databases 154, 160 may have been provided 202 by an advertiser such as the owner of the SonoBeacon device 102 and/or an external advertiser in either a pre-broadcasting phase or may be created on the fly by a user of a mobile device 108 equipped with the SonoBeacon Application 148. Each specific piece of content 158 is thereby mapped to a specific watermark 156 and each specific event 164 is mapped to a specific triggering command 162. For security reasons, this mapping of watermarks 156 and triggering commands 162 to specific pieces of content 158 and specific events 164, respectively, may be implemented to change automatically on a regular basis. When the SonoBeacon software component 150 accesses 204 the databases 154, 160, it extracts 204 a specific watermark 156 and/or triggering command 162 which it wants to broadcast to mobile devices 108 located in its environment.

Said extracted specific watermark 156 or triggering command 162 are encoded 206 into a digital signal using an error correcting coding. If both a specific watermark 156 and a triggering command 162 are extracted from a database, they are both encoded together into a digital signal using error correcting coding. Hereby, the transmitted data rate is calculated in a variable way, which means that the actual bit length corresponding to the data part of the signal changes dynamically. The information about the number of data bits comprised in the broadcasted signal is contained in the first, so called start bits of the broadcasted signal. Hence, it is rendered more difficult for a wire tapper to identify the correct number and types of bits belonging to the broadcasted data. Moreover, also the number of bits of the key which is shared between the SonoBeacon device 102 and a mobile device 108 is kept variable. Further, also the seed for generating a shared key is permuted regularly in order to further enhance security of data transmission.

The resulting digital signal is configured to trigger mobile devices 108 in a context sensitive way, this context being provided based on the watermark 156 being part of the encoded signal. Using encoding 206 in the form of error correction encoding however, may serve only as an illustrative example for encoding a specific watermark 156 and a triggering command 162 together into one resulting digital or analog signal. In other implementations, further, alternative or additional encoding techniques may be used to generate a digital signal based on encoding the acoustic watermark 156 and the triggering command 162.

At the same time, the signal processing component 122 of the SonoBeacon device 102 which is configured to broadcast a specific, context-related content continuously scans 208 the noise signals received by its audio signal receiver 130 such as a microphone. These received noise signals are processed by the signal processing component 122 in order to identify an exactly defined frequency range which is least hampered by acoustic noise from the environment.

Moreover, the signal processing component 122 determines which volume may be necessary for broadcasting audio signals 120 based on the analysis of the received acoustic noise so that the resulting audio signal will still be clearly noticeable at the audio signal receiver 132 of a mobile device 108 located at a maximum distance from the broadcasting audio signal transmitter 126 of the SonoBeacon device 102, for which correct functionality of the near-field communication technique disclosed in the present application is still guaranteed. In some example implementations, this maximum distance from the SonoBeacon device 102 may be selected to be very small in order to ensure that the audio signal 120 may only be detectable and decipherable if respective mobile devices 108 are located very close to the audio signal transmitter 126 of the SonoBeacon device 102. In other, alternative or additional implementations, frequency range and volume may be tuned such that the audio signal 120 is detectable and decipherable in a preferably large range up to the maximum distance possible based on the technique disclosed herewith in order to address also far away mobile devices 108. In further implementations, the audio signal 120 may always be broadcasted by the audio signal transmitter 126 of the SonoBeacon device at the highest volume possible.

Subsequently, an exactly defined frequency range and possibly a volume are selected for broadcasting the audio signals 120. This process of finding an appropriate frequency range for transmitting an audio signal 120 is further particularly important in embodiments in which the SonoBeacon device 102 transmits audio signals 120 comprising different watermarks 156 and/or trigger commands 162 instantaneously to a number of different mobile devices 108.

In aspects of the present invention, an exactly defined frequency range is selected 210 that is non-audible for an average human ear, since it is either in the ultra- or in the infrasound frequency range. Alternatively however, also a frequency range may be selected 210 that is indeed audible for humans.

The encoded digital signal is then modulated 212 into a high or low frequency audio signal 120 depending on the selected exactly defined frequency range and the selected volume using modulation schemes, for example amplitude shift keying (ASK), amplitude modulation, frequency shift keying (FSK), frequency modulation and/or quadrature amplitude modulation (QAM). QAM conveys message signals by modulating the amplitudes of two carrier waves using ASK and/or FSK. These two carrier waves of the same frequency are out of phase by 90°. The modulated waves are then summed and the resulting signal is a combination of phase-shift keying (PSK) and amplitude-shift keying (ASK). These modulation schemes, however, only serve as examples of modulation schemes. More particularly, alternative and/or additional modulation schemes, for example further digital modulation schemes, may be used for generating the high or low frequency audio signal 120 from the encoded signal. In some example implementations, in particular a combination of several of these modulation schemes may apply, for example a combination of frequency FSK and amplitude shift keying ASK.

As can be seen from FIG. 1, both the SonoBeacon device 102 and the mobile device 108 are equipped—apart from with audio signal receivers 130, 132—also with sensors enabling wireless connections via Bluetooth 112, 114 and Wifi 116, 118. In an embodiment of the present invention, the SonoBeacon device 102 may act as a WIfI-router 116 to which a mobile device 108 in its vicinity may connect. For example, the mobile device 108 may be able to detect WIfI networks 110 while its audio signal receiver 132 is still switched off. Therefore, in the vicinity of a SonoBeacon device 102, the mobile device 108 may be able to detect a WIfI network 110 provided by the WIfI-router 116 located on the SonoBeacon device 102. This SonoBeacon WIfI 110 may be further configured such that mobile devices 108 on which the SonoBeacon Application 148 is installed require no password for connecting to it. As soon as a signal originating from a SonoBeacon WIfI router 116 is detected on a mobile device 108 on which the SonoBeacon Application 148 is installed, the SonoBeacon Application 148 may automatically connect the mobile device 108 to the SonoBeacon WIfI 110. The SonoBeacon device 102 may, on the other hand, be configured such that it automatically transmits 214 a command to newly connected mobile devices 108 instructing a user by e.g. displaying a pop-up message to switch on 216 an audio signal receiver 132 such as, e.g., a microphone. In an alternative embodiment, a user of the mobile device 108 may also select in the settings of the SonoBeacon Application 148 that an audio signal receiver 132 is automatically switched on 216 when the mobile device is connected to a SonoBeacon WIFI 110. Hence, transmitting 214 a command to switch on 218 an audio signal receiver 132 of a mobile device 108 via a WIFI network 110 obviates the need to keep an audio signal receiver 132 of a mobile device 108 such as a microphone always switched on. By switching on an audio signal receiver 132 only in the presence of a SonoBeacon device 102 while keeping it switched off most of the time greatly reduces battery consumption of a mobile device 108. Moreover, the established WIFI connection 110 between the SonoBeacon device 102 and the mobile device 108 via the SonoBeacon WIFI 110 may be used to transmit 218 the information about the selected exactly defined frequency range and possibly volume for broadcasting the audio signal 120 from the SonoBeacon device 102 to the mobile device 108.

Equivalently, in an alternative embodiment, the Bluetooth sensors 114 of a mobile device 108 of a user entering an area within the range of a SonoBeacon device 102 may be switched on, while the audio signal receiver 132 may be still switched off. Due to the switched on Bluetooth sensor 114 of the mobile device 108, the SonoBeacon device 102 is enabled to detect the presence of the mobile device 108 via Bluetooth. Hence, a user of the mobile device 108 may receive a notification by Bluetooth telling him or her to switch on 216 the audio signal receiver 132 of his or her mobile device 108 in order to be able to receive audio signals 120 from a SonoBeacon device 102. Moreover, in a same way as described above in the case of a WIFI connection 110 between the SonoBeacon device 102 and the mobile device 108, also the set up Bluetooth connection 110 between the two devices may be utilized to transmit 218 the information about the selected exactly defined frequency range and possibly volume for broadcasting the audio signal 120 from the SonoBeacon device 102 to the mobile device 108.

Based on this information about the selected exactly defined frequency range, the signal processing component 124 of the mobile device 108 may be able to tune 220 the audio signal receiver 132 such as e.g. a microphone of the mobile device 108 to exactly the selected frequency range, in which the actual audio signal 120 transmitting additional content 158 will be expected. Moreover, the SonoBeacon Application 148 may instruct the signal processing component 124 to perform the costly steps of demodulating and decoding received audio signals 120 only for audio signals 120 received within the clearly defined frequency range and alternatively additionally at a certain volume. Any received audio signals 120 which do not comply with the information transmitted from the SonoBeacon device 102 to the mobile device over a wireless network 110 such as e.g. WIFI or Bluetooth will not be considered by the signal processing component 124 of the mobile device 108. Since the demodulation of the complex QAM or comparable protocol and the decoding algorithm is not erroneously performed for noise signals and since the audio signal receiver 132 does not need to search the whole frequency range for detecting the actual signal 120, computing resources may be saved and finally energy consumption may be significantly reduced on the mobile device 108, extending lifetime of its battery.

In alternative embodiments of the present invention, the information about the selected exactly defined frequency range and possibly also the volume for broadcasting an audio signal 120 providing context-related additional content 158 to a mobile device 108 may also be transmitted 218 to the mobile device 108 by an acoustic broadband signal. The signal processing component 122 of the SonoBeacon device 102 may generate such a broadband signal, which is then broadcasted by the audio signal transmitter 126 of the SonoBeacon device 102. The audio signal receiver 132 of a mobile device 108 located in the proximity of the SonoBeacon device 102 receives this acoustic broadband signal. This acoustic broadband signal can be easily detected without querying the whole frequency range due to its broadband character. The signal processing component 124 of the mobile device 108 processes this broadband signal and thus the information about the frequency range in which the actual audio signal 120 will be transmitted and the expected volume of the actual audio signal 120 can be obtained by the SonoBeacon Application 148 of the mobile device 108 so that the audio signal receiver 132 may be tuned 220 to the selected exactly defined frequency range.

In embodiments of the present invention, the audio signal receiver 132 of the mobile device 108 further has to receive a triggering signal within the selected exactly defined frequency range before the signal processing component 122 eventually begins the very resource-intensive process of demodulating the complex QAM or comparable protocol of an encoded and modulated audio signal 120 transmitting the additional context-related content. Whereas an encoded and modulated audio signal 120 generally comprises 24 bit, whereby also any other bit length is possible and comprised in embodiments of the present invention, the triggering signal usually merely comprises a few bits. Therefore, it can be processed in a very light and resource-efficient way. Hence, said triggering signal triggers the SonoBeacon Application 148 to "listen" to any subsequently broadcasted audio signal and to process it accordingly in the way described in the following.

In alternative embodiments of the present invention, the SonoBeacon Application 148 on a mobile device 108 may also be pre-programmed to receive the encoded and modulated audio signal 120 in a fixed frequency range. Hence, it may not be necessary to transmit information about an exactly defined frequency range from a SonoBeacon device 102 to a mobile device 108. Instead, the audio signal receiver 132 of the mobile device 102 is automatically tuned to the fixed frequency range in which it receives a light, easy-to-decipher triggering signal informing the SonoBeacon Application 148 to process any encoded and modulated audio signals 120 which will be received from now on.

In a next step, the encoded and modulated audio signal 120 is then broadcasted 222 via the audio signal transmitter 126 of the SonoBeacon device 102, i.e. the modulated high or low frequency audio signal 120 is played back by the audio signal transmitter 126, e.g. a loudspeaker, to be broadcasted 222 into its surrounding environment. In example implementations, this surrounding environment of loudspeaker 126 may encompass a range of 5 to 7 meters, in some example implementations this range may be up to 10 meters.

The encoded and modulated audio signal 120 may in some example implementations be broadcasted 222 as a single audio signal, i,e, standalone. In some example implementations, the encoded and modulated audio signal 120 may also be overlaid on some basic acoustic signal, e.g. audio broadcast or background music being played in a mall or supermarket via public speakers, or the like.

Within this surrounding environment, the audio signal receiver 132 of a mobile device 108 may be able to receive 224 the encoded and modulated audio signal 120 broadcasted 222 by the audio signal transmitter 126 of the SonoBeacon device 102. The audio signal receiver 132 of the mobile device 108 may be a microphone or be coordinated as an array of microphones.

Subsequently, the signal processing component 124 of the mobile device 108 can demodulate 226 the recorded audio signal 120 to reproduce the encoded, unmodulated signal. Hereby, the signal processing component 124 is similar to the signal processing component 122 of the SonoBeacon device 102 and hence capable of performing the same method steps in a reverse direction. The signal processing component 124 may form a separate component or may be included into the SonoBeacon Application 148 previously installed on the mobile device 108.

After having demodulated 226 the audio signal 120 to receive the digital signal, the signal processing component 124 decodes 228 the digital signal using decoding schemes that match the initially applied coding schemes, e.g. the error correcting coding that was initially applied to create the digital signal by the signal processing component 122 of the SonoBeacon device 102. After this, e.g. error correcting decoding 228 of the demodulated signal, the signal processing component 124 derives the originally unique audio watermark 156 and/or the triggering command 162.

The SonoBeacon Application 148 subsequently conveys the unique audio watermark 156 and/or the triggering command 162 via a network 110 such as wireless or wireline internet connections to the server 152 comprising databases 154, 160 of look-up tables of audio watermarks 156 mapped to specific context-related content 158 and triggering commands 162 mapped to specific context-related events 164 to occur. Then, the databases 154, 160 are searched 230 in order to identify a match of a received watermark 156 and/or received triggering command 162 with watermarks 156 and triggering commands 162 previously stored in the databases 154, 160. The specific complementary content 158 related to the identified acoustic watermark 156 is determined and particular events 164 are looked up which are to occur according to the identified triggering command 162. Such triggering commands 162 trigger the SonoBeacon Application 148 to execute an operation, for example emitting a specific sound, emitting a specific light signal and/or replaying an audio or video file stored on the database or the mobile device 108. These operations, however, only serve as illustrative examples, and thus the triggering command 162 may trigger a variety of different and/or additional operations. Moreover, the triggering command 162 may also trigger a combination of different operations to be executed.

The SonoBeacon Application 148 is further triggered to pull the respective complementary content items 158 and/or events 164 from the databases 154, 160 and subsequently displays or renders 232 said complementary content 158 and/or events 164 on the display 146 of the mobile device 108.

It is important to note that in further embodiments of the present invention, the described process of transmitting audio signals may also be performed in the opposite direction, i.e. from the mobile device 108 to the SonoBeacon device 102. The SonoBeacon Application 148 may extract a watermark 156 and/or triggering command 162 from the databases 154, 160 of watermarks 156 and of triggering commands 162, respectively, or generate a new watermark 156 or triggering command 162, which is then stored together with its specific content 158 or specific event 164 in the lookup tables of the databases 154, 160. In a next step, the SonoBeacon Application 148 may trigger the signal processing component 124 of the mobile device 108 to process the extracted or generated watermark 156 or triggering command 162 in the same way as the watermark 156 and/or triggering command 162 is processed by the signal processing component 122 of the SonoBeacon device 102. Hence, at first error correcting encoding is performed on the watermark 156 and/or triggering command 162, before modulation schemes are applied to generate an encoded, modulated audio signal 120 in a frequency range which is not hampered by background acoustic noise. The SonoBeacon device 102 may be informed about the selected frequency range and volume for broadcasting the encoded and modulated audio signal 120 by a signal transmitted over a wireless network 110 such as a WIFI or Bluetooth or alternatively by a broadband acoustic signal. The encoded, modulated audio signal 120 is then broadcasted by the audio transmitter device 128 of the mobile device 108 such as, e.g., a loudspeaker, into the near environment of the mobile device 108. If the mobile device 108 is located in proximity to a SonoBeacon device 102, this SonoBeacon device 102 may receive said transmitted audio signal 120 with its audio signal receiver 130. Hereby, the audio signal receiver 130 of the SonoBeacon device 102 may be for example a microphone. Subsequently, the processes of demodulation and decoding, which have been described above to be performed on the mobile device 108, are performed by the signal processing component 122 of the SonoBeacon device 102. Finally, the SonoBeacon software component 150 accesses the databases 152, 160 of watermarks 156 and triggering commands 162 in order to identify the specific content 158 related to the received watermark 156 and/or triggering command 162.

Figure 3:
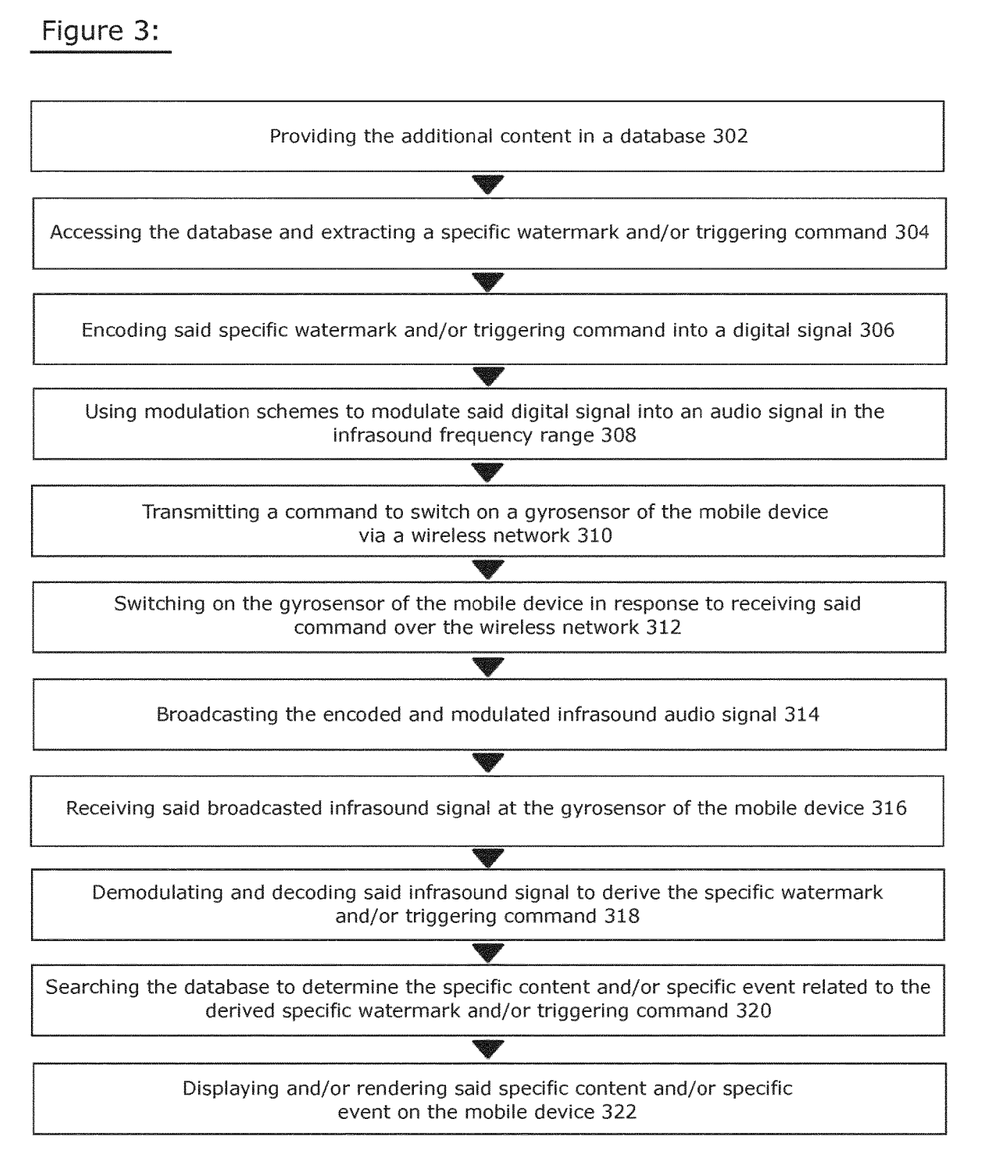
FIG. 3 is a flow diagram that shows a method for dynamically providing context-related additional content to a mobile device by broadcasting audio signals by a computing device in the infrasound frequency range, according to another embodiment of the present invention.

Referring to FIG. 3, a method for dynamically providing context-related additional content 158 to a mobile device 108 by broadcasting audio signals 120 using a computing device 102 such as the SonoBeacon device 102 specifically in the infrasound frequency range is discussed.

As discussed already in the embodiment of FIG. 2, first of all, additional content 158 is provided 302 to a database 154 by an advertiser such as the owner of the SonoBeacon device 102 and/or an external advertiser in either a pre-broadcasting phase or may be created on the fly by a user of a mobile device 108 equipped with the SonoBeacon Application 148. Each specific piece of content 158 is thereby mapped to a specific watermark 156 or and each specific event 164 is mapped to a triggering command 162. For security reasons, this mapping of watermarks 156 and triggering commands 162 to specific pieces of content 158 and specific events 164, respectively, may be implemented to change automatically on a regular basis. When the SonoBeacon software component 150 accesses 304 the databases 154, it extracts 304 a specific watermark 156 and/or triggering command 162 which it wants to broadcast to mobile devices 108 located in its environment. Said databases 154, 160 may be either maintained locally on the SonoBeacon device 102 or may be stored on a separate server 152. If the databases 154, 162 are maintained on a separate server, it is accessed 304 by the SonoBeacon software component 150 over a network 110 such as the internet or Bluetooth.

Said extracted specific watermark 156 and/or triggering command 162 are encoded 306 into a digital signal using an error correcting coding which may be further characterized by the same features for enhancing security such as a variable bit lengths and permuted keys as described above with respect to FIG. 2. Obviously and as mentioned above with respect to FIG. 2, using encoding in the form of error correction encoding may serve only as an illustrative example for encoding a specific watermark 156 and a triggering command 162 together into one resulting digital or analog signal and alternative or additional coding techniques may also be applied.

The encoded digital signal is then modulated 308 into a low frequency audio signal in the infrasound frequency range using modulation schemes, for example ASK, amplitude modulation, FSK, frequency modulation and/or QAM, which have been described in more detail above with respect to FIG. 2.

In an embodiment of the present invention, the mobile device 108 is equipped with one or more gyrosensors 134, which generally serve to determine the orientation of the display 146 of a mobile device 108 based on measured accelerations. However, in an embodiment of the present invention, said one or more gyrosensors 134 of the mobile device 108 may act as audio signal receivers 132 in the infrasound frequency range, since they may be excited by low frequency sound waves.

Like other audio signal receivers 132 described with respect to FIG. 2, also said one or more gyrosensors 134 are generally switched off on the mobile device 108 when a user of the mobile device 108 enters an area in which audio signals 120 of a SonoBeacon device 102 are receivable. Sensors such as e.g. the one or more gyrosensors 134 of the present embodiment of the invention generally consume a significant amount of battery power when kept in an active mode. However, as both the SonoBeacon device 102 and the mobile device 108 are further equipped with sensors enabling wireless connections via Bluetooth 112, 114 and WIFI 116, 118, said one or more gyrosensors 134 of the mobile device 108 may be switched on 312 by transmitting 310 a respective command to the mobile device 108 via a wireless network 110. Such a wireless network 110 between the SonoBeacon device 102 and the mobile device 108 may be established in a similar way as described above with respect to FIG. 2 for example by the SonoBeacon device 102 acting as a WIFI-router 116 providing a wireless network 110 to which the mobile device 108 may connect automatically by means of the SonoBeacon Application 148 or by setting up a Bluetooth connection 110 between the SonoBeacon device 102 and the mobile device 108.

In a next step, the encoded and modulated audio signal 120 is then broadcasted 314 via the audio signal transmitter 126 of the SonoBeacon device 102, i.e. the modulated infrasound frequency audio signal is played back by the audio signal transmitter 126, e.g. a loudspeaker, to be broadcasted 314 into its surrounding environment.

Audio signals 120 broadcasted 314 in the infrasound frequency range are generally detectable in a wider area around the audio signal transmitter 126 compared to signals transmitted at larger frequencies in the audible or ultrasound frequency range. Infrasound signals are able to penetrate through materials such as walls. Therefore, particularly in indoor environments, broadcasting 314 audio signals 120 in the infrasound wavelength range may significantly enhance the area in which an audio signal 120 may still be detected.

The broadcasted encoded and modulated audio signal 120 in the infrasound frequency range is subsequently received 316 by the one or more gyrosensors 134 of the mobile device 108 located in the vicinity of the SonoBeacon device 102.

Subsequently and in the same way as described above with respect to FIG. 2, the signal processing component 124 of the mobile device 108 can demodulate and then decode 318 the recorded infrasound audio signal in order to derive the original, specific audio watermark 156 and/or the triggering command 162.

In a next step and again similarly as in the embodiment described above with respect to FIG. 2, the SonoBeacon Application 148 searches 320 the databases 154, 160 in order to determine the specific content 158 and/or specific event 164 related to the derived specific watermark 156 and/or triggering command 162.

The SonoBeacon Application 148 further extracts the respective complementary content items 158 and/or events 164 from the databases 154, 160 and subsequently displays or renders 322 said specific complementary content 158 and/or specific events 164 on the display 146 of the mobile device 108.

It should be pointed out that as illustrated in FIG. 1, both the SonoBeacon device 102 and the mobile device 108 described in embodiments of the present invention may further comprise—in addition to audio sensors such as microphones 130, 132 and gyrosensors 134 and wireless network sensors such as Bluetooth 112, 114 and WIFI sensors 116, 118—equipment 136, 138 for receiving signals from satellite systems such as GPS, Galileo, GLONASS, Beidou etc. Hence, their exact location may also be determined by one of these global navigation satellite systems. In further embodiments, also optical sensors 140, 142 on both the SonoBeacon device 102 and the mobile device 108 may be employed in order to set up a communication link.

These many different types of sensors comprised in the SonoBeacon device 102 and in the mobile device 108 may be also configured to interact in different ways as merely in those described above with respect to FIGS. 2 and 3. For example, in another embodiment of the present invention, the audio signal receiver 132 of a mobile device 108 in the vicinity of a SonoBeacon device 102 may be turned on, but the WIFI receiver 118 may be switched off. Since it might be advantageous to connect a mobile device 108 to a WIFI 110, for example in order to obtain the context-related specific contents 158 from a database or from databases 154, 160 which are stored on an external server 152 or on the SonoBeacon device 102 via a stable and fast internet connection, an audio signal 120 may be transmitted by the audio signal transmitter 126 of the SonoBeacon device 102 to the audio signal receiver 132 of the mobile device 108 instructing a user to turn on the WIFI receiver 118 of the mobile device 108. While being advantageous, a WIFI connection 110 between a SonoBeacon device 102 and a mobile device 108 is not a prerequisite for the functioning of the general technique of providing additional context-related content to a user of a mobile device 108 by sound signals 120. For example, some of the transmitted audio watermarks 156 or triggering commands 162 may be directly executed by the SonoBeacon Application 148 without consulting a database 154, 160 with a lookup table. Certain, limited contents may also be locally stored in the SonoBeacon Application 148 of a mobile device 108. Based on these locally stored contents and information, certain applications such as, e.g., navigation of a user of a mobile device 108, may become possible without a connection to a network 110 such as the internet.

Figure 4:
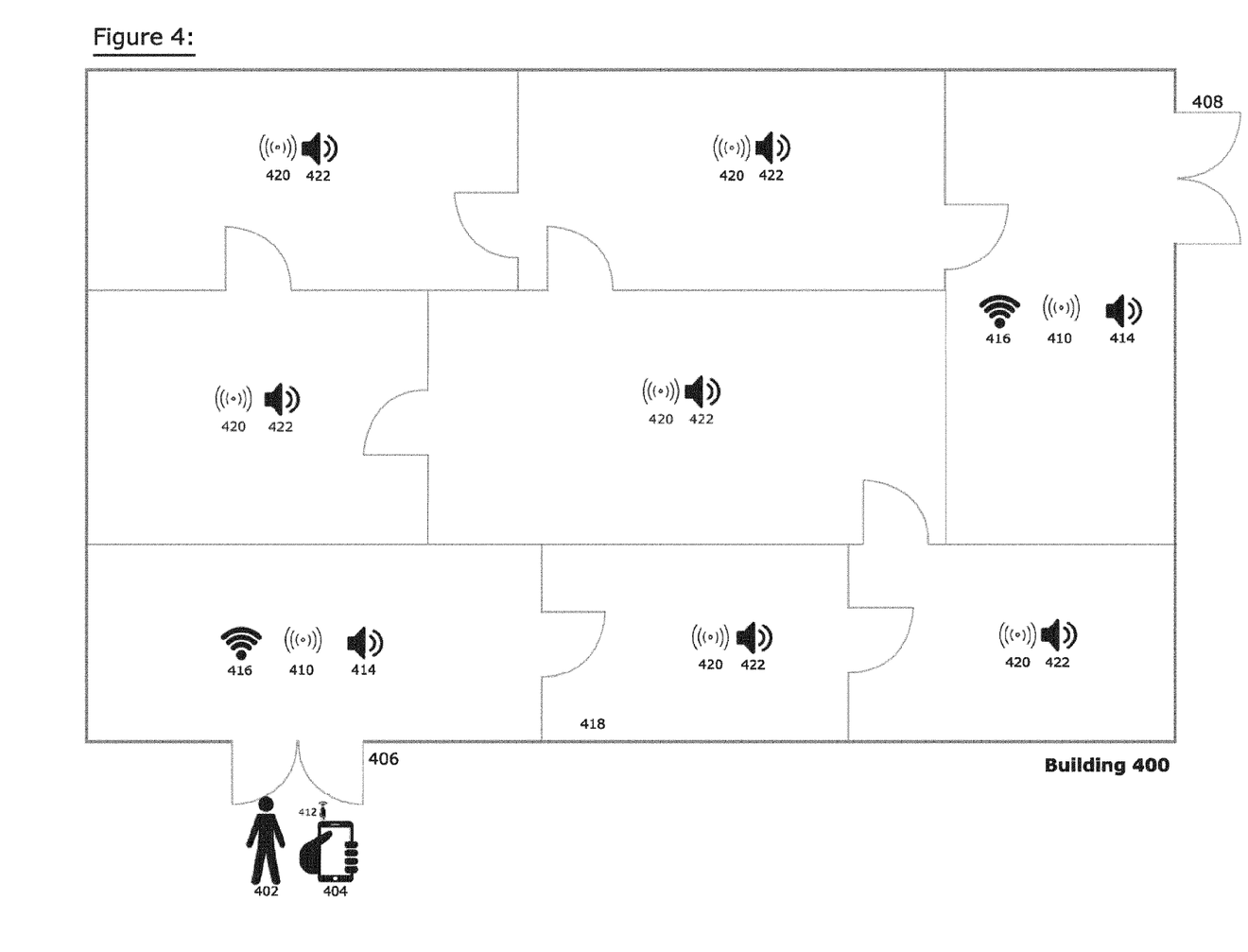
FIG. 4 depicts an example environment for employing a system and method for dynamically providing context-related additional content to a mobile device by broadcasting audio signals by a computing device according to embodiments of the present invention.

This point is further illustrated and explained with respect to FIG. 4, which depicts an example embodiment of the present invention. FIG. 4 shows a building 400 such as for example a museum or a shopping mall, in which a user 402 equipped with a mobile device 404 on which the SonoBeacon Application is installed, may enter through entrances 406 or 408. At both entrances 406 and 408, a SonoBeacon device 410 is located. For example purposes only, it is now assumed that all relevant sensors of the user's 402 mobile device 404 are switched on and that hence it is not necessary to switch on either sensors with the help of other available sensors. However, all situations in which such a process of switching on different sensors is necessary once the user enters the environment of a SonoBeacon device are obviously included in the present invention.

As soon as a user 402 with a mobile device 404 on which the SonoBeacon Application is installed enters the, e.g., museum 400 through one of entrances 406 or 408, the audio signal receiver 412 of his or her mobile device 404 receives an encoded, modulated audio signal 414 from the SonoBeacon device 410 located at the entrance 406 or 408. After processing the received audio signal 414 as described above with respect to FIG. 2 or 3, a triggering command is extracted which triggers the SonoBeacon Application to retrieve all relevant content from a database and to cache it temporarily on the mobile device 404. For example, in the case of a museum 400, all available explanations about the exhibits in the museum 400 may be retrieved from an external server, which may be a part of the SonoBeacon device 410. In order to assure that this retrieving of content from a server can be performed in a fast and efficient way, the mobile device 404 of the user 402 has been automatically connected to the SonoBeacon WIFI 416 provided by the SonoBeacon device 410, as detailed above.

To continue the example, the explanations about the exhibits of the museum may be available in different languages such as English, German, French and Chinese. The SonoBeacon Application on a user's 402 mobile device 404 may automatically recognize the preferred language of a user 402 due to the general language settings of the user's 402 mobile device 404. Hence, the SonoBeacon Application which has been instructed by the received triggering command to retrieve all available explanations about the exhibits of the museum 400 from a server does not have to retrieve these explanations in all available languages. Instead, if the SonoBeacon Application for example determines that the preferred language of a user 402 is French, it merely obtains the explanations in French from the server to cache them on the mobile device 404.

Said example shows how the SonoBeacon technology may additionally take into account user specific parameters when providing context-related content. Further and even much more detailed user information may be used in the present invention. For example, the SonoBeacon Application may be configured to be allowed to access a user's social media or e-mail account. Based on these and other activities and information about e.g. demographics or personal preferences provided directly by a user, a detailed personalized and dynamic user profile 168 may be created and stored on the mobile device. These user profiles 168 containing also data like characteristics of a user's history of activity while interacting with the SonoBeacon Application 148, features of a user's current and/or past geo-context as determined using satellite navigation systems such as GPS etc., date and time of day and the like may be kept on the mobile device 108 to account for privacy and data protection considerations in example implementations. In alternative embodiments, these user profiles 168 may also be exchanged and stored on an external server 152 in a database 166 or on a server being included in a SonoBeacon device 102. These user profiles 168 may then be taken into consideration when providing a user with context-related additional content by audio signal synchronization. The mentioned elements of an individual, personalized user profile 168, however, are solely of illustrative and exemplary character and thus in several implementations of the present invention, further, additional or alternative elements and characteristics may be stored in such user profiles 168.

Again coming back to the example of a SonoBeacon user 402 entering a museum 400 equipped with the SonoBeacon technology, after having paid the entrance fee he or she may direct him- or herself to the first exhibition hall 418 of the museum 400. In said first exhibition hall 418, another SonoBeacon device 420 may be located. This SonoBeacon device 420 of the first exhibition hall 418 merely needs to transmit an audio signal 422 to the user's 402 mobile device 404 so that the SonoBeacon Application displays the relevant explanations corresponding to the exhibits on display in the first exhibition hall 418. Since the SonoBeacon Application has already cached all available explanations about all the exhibits in the museum 400 in French, the SonoBeacon Application does not need to connect to an external database and retrieve the respective information about the exhibits in the first exhibition hall 418 from there. Instead, the SonoBeacon Application may directly display or render the appropriate explanations comprised in its cache. Hence, the SonoBeacon 420 located in the first exhibition hall 418 does not need to provide a SonoBeacon Wifi 416 to which mobile devices 404 with a SonoBeacon Application may connect. Moreover, the SonoBeacon Application does not have to access an external database each time the mobile device 404 receives an audio signal 422 from a SonoBeacon device 420. In certain embodiments of the present invention, it may also be feasible to track the location of a user 402 of a mobile device 404 by receiving signals from global navigation satellite systems such as GPS, Galileo, GLONASS, Beidou etc., thus obliging the need to provide further SonoBeacon devices 420 for tracing the movement of a user 402 within the museum 400. In these cases, the accuracy of these global navigation satellite systems may be sufficient to inform the SonoBeacon Application on a user's 402 mobile device 404 that a user 402 has entered a new exhibition hall such as first exhibition hall 418. Based on this received location information, the SonoBeacon Application subsequently displays or renders the explanations corresponding to the exhibits displayed in this new exhibition hall.

Hence, in such an embodiment, the total number of SonoBeacon devices 420 and the number of acoustic signals 422 which have to be transmitted between the SonoBeacon devices 420 and the mobile devices 404 can be significantly reduced and a large amount of energy can be saved.

Figure 5:
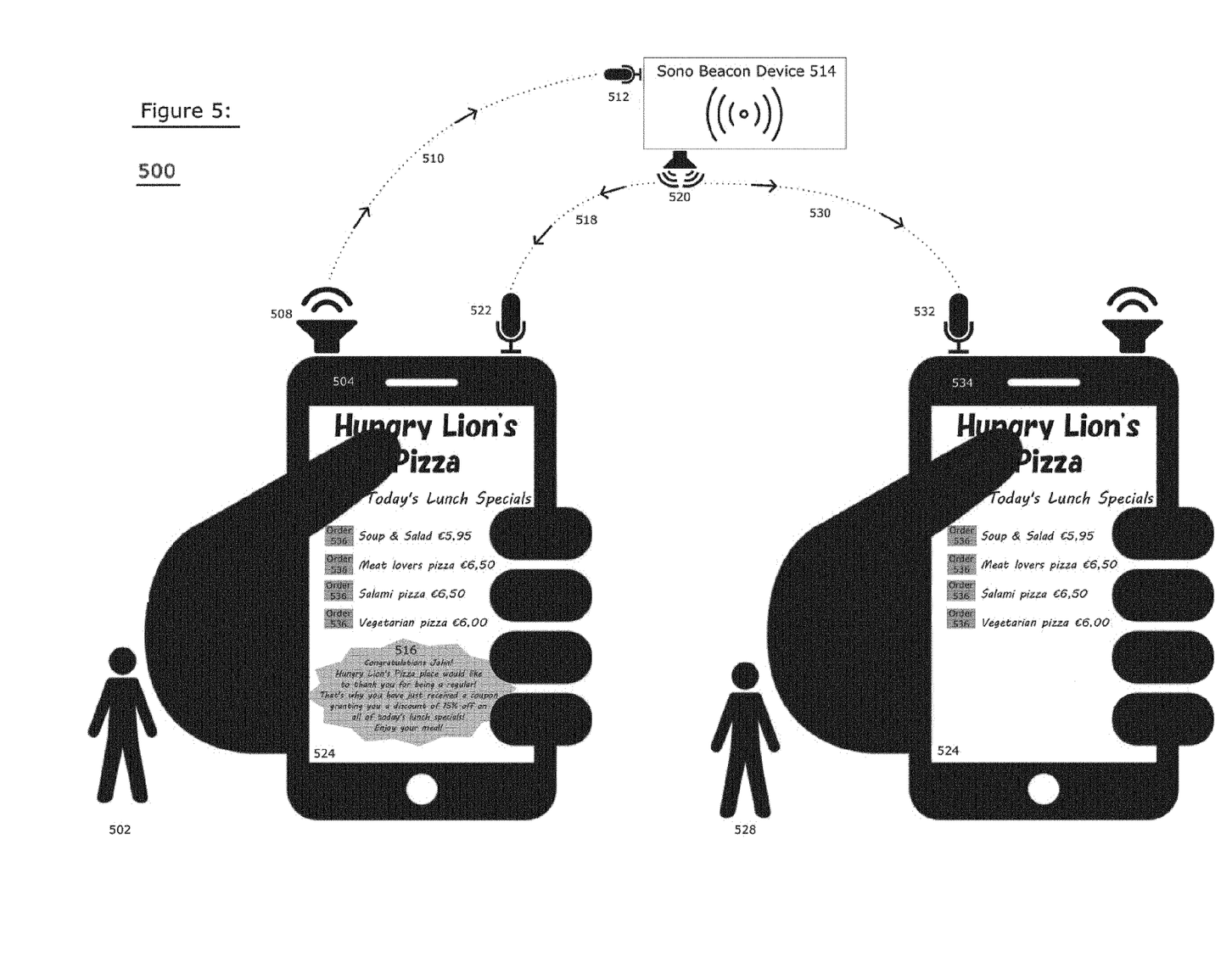
FIG. 5 shows another example environment for employing a system and method for dynamically providing context-related additional content to a mobile device by broadcasting audio signals by a computing device according to embodiments of the present invention.

FIG. 5 illustrates a further example embodiment 500, in which the SonoBeacon technology of the present invention may be employed. A user 502 on whose mobile device 504 the SonoBeacon Application is installed enters a SonoBeacon-enabled restaurant 506. For example purposes only, it is now assumed that all relevant sensors of the user's 502 mobile device 504 are switched on and that hence it is not necessary to switch on either sensors with the help of other available sensors. However, all embodiments in which such a process of switching on different sensors is necessary once the user 502 enters the environment of a SonoBeacon device are obviously included in the present invention.

In a first step, the audio signal transmitter 508 such as e.g. a loudspeaker on the user's 502 mobile device 504 transmits an audio signal 510 which is received by the audio signal receiver 512 of the SonoBeacon device 514. The signal processing component of the SonoBeacon device 514 processes the audio signal 510 in such a way that the SonoBeacon software component is finally able to determine that the audio signal 510 has been received from the mobile device 504 of a user 502 who is listed as a regular customer.

The restaurant owner may want to provide a special offer to all regular customers, like e.g. 15% off on all of today's lunch specials and has accordingly changed the settings in the SonoBeacon software component. Hence, the SonoBeacon software component extracts from the database or databases not only a watermark corresponding to today's lunch specials, but additionally a triggering command which should result in a pop-up message 516 on a regular customer's mobile device 504 notifying him or her of the 15% discount. Subsequently, the signal processing component generates a combined, encoded and modulated audio signal 518 comprising both the watermark and the triggering command. This combined, encoded and modulated audio signal 518 is broadcasted by the audio signal transmitter 520 of the SonoBeacon device 514 and received by the audio signal receiver 522 of a regular customer's mobile device 504. Having performed the steps of demodulating and decoding and identifying the corresponding content linked to the watermark and the triggering command, the SonoBeacon Application on a regular customer's mobile device 504 displays today's lunch specials 524 and additionally notifies the regular customer 502, e.g. by a pop-up message 516 which might be additionally accompanied by a sound or light effect 526 of the 15% discount granted today to regular customers.

Instead, a 'normal' customer 528 who is not listed as a regular customer of the restaurant 506, merely receives today's lunch specials 524 from the SonoBeacon device 514. Hence, the audio signal transmitter 520 of the SonoBeacon device 514 broadcasts a different encoded and modulated audio signal 530 which merely comprises the watermark linked to today's lunch specials 524 to the audio signal receiver 532 of the mobile device 534 of such a 'normal' customer 528. In another embodiment, it may be possible to encode a same watermark together with different triggering commands, which results in triggering different specific events, while a similar context-related content is displayed or rendered on different mobile devices. Alternatively, a same triggering command may be encoded together with different watermarks and thus may lead to a similar or same event to be triggered on the mobile device, while the context-sensitive content being displayed or rendered on the mobile device may be completely different since it is based on the respective watermark encoded in the audio signal. The triggering command thus acts as a second degree of freedom for providing additional context-related content to users of a SonoBeacon-enabled mobile device, which can be randomly combined with an underlying watermark.

Referring again to the example embodiment 500 of FIG. 5, today's lunch specials 524 which are displayed on the mobile devices 504 and 534 of both regular 502 and 'normal' customers 528 may be provided with a button 536 that a user 502, 528 may select to directly order a specific lunch special. The payment for the ordered lunch special may be effected automatically through a user's SonoBeacon account, in which he or she has provided one or more payment methods, such as credit cards or bank accounts.

However, in further embodiments of the present invention, a user of a mobile device may be provided with further interactive functionalities for listening, voting, gaming or even sending individual contributions to an owner of a SonoBeacon device. For example, a user of a SonoBeacon-enabled mobile device may be able to vote and comment on a current radio broadcast, send a message to the owner of a SonoBeacon device, take advantage of a gaming option, change or adjust radio program preferences, etc. Therefore, in example implementations, a user is provided with interactive options that transform a formerly passive user into an active user that directly communicates via the SonoBeacon Application.

In some embodiments of the present application, the SonoBeacon device may additionally take into account further user specific information. For example, the SonoBeacon device may keep a list of previous orders of a regular customer, based on which he or she may be provided with a different menu of today's lunch specials than a second regular customer who e.g. might have been identified by the SonoBeacon device to be a vegetarian.

Figure 6:
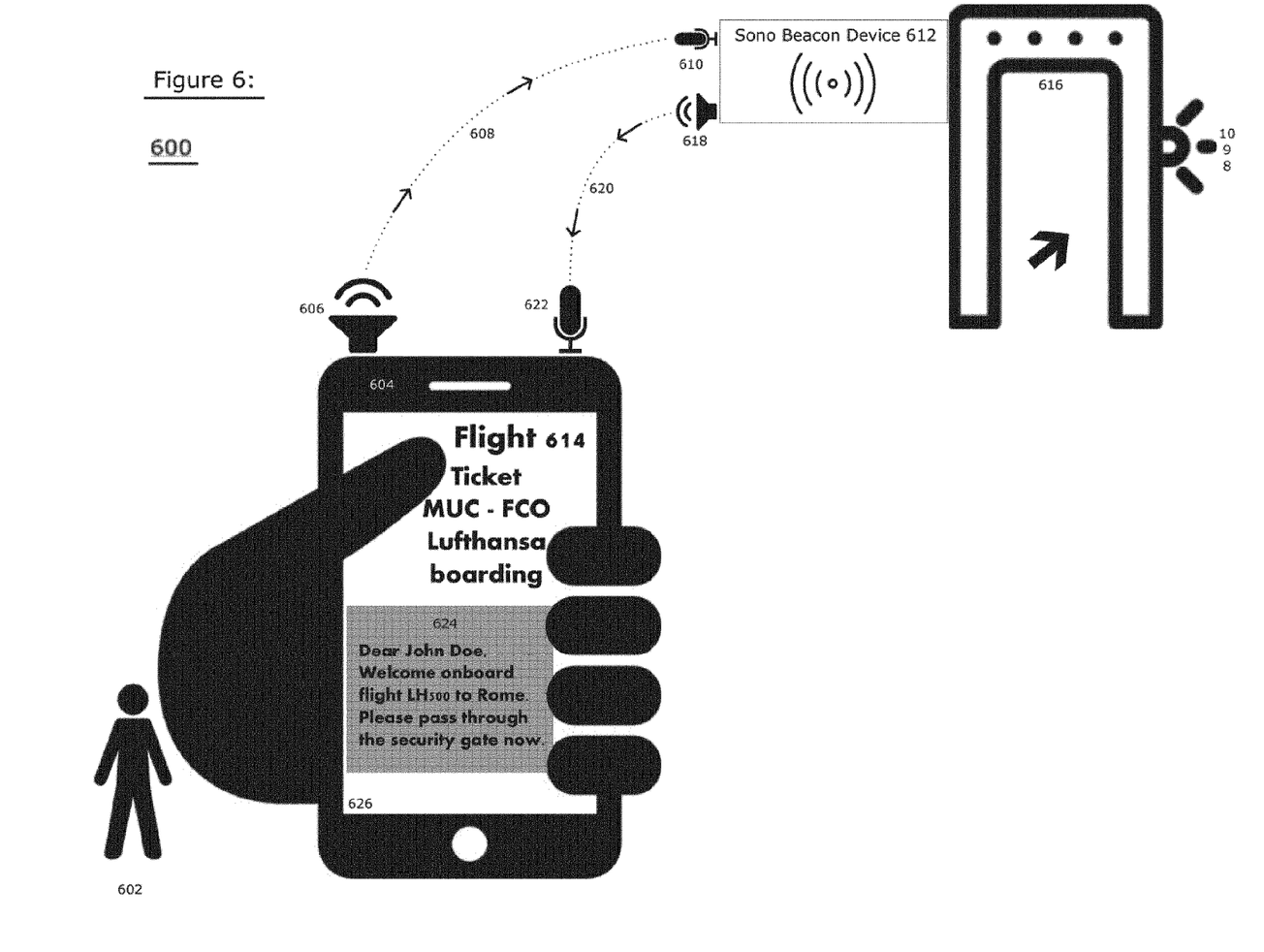
FIG. 6 shows an example environment for employing a system and method for dynamically extracting context-related additional content from a mobile device by broadcasting audio signals by the mobile device according to embodiments of the present invention.

FIG. 6 illustrates a further example embodiment 600, in which the SonoBeacon technology of the present invention may be employed for providing access control functionality, thus enhancing security when granting access to restricted areas. A user 602 on whose mobile device 604 the SonoBeacon Application is installed wants to access a restricted area such as e.g. a museum or a boarding area at an airport. For example purposes only, it is now assumed that all relevant sensors of the user's 602 mobile device 604 are switched on and that hence it is not necessary to switch on either sensors with the help of other available sensors. However, all embodiments in which such a process of switching on different sensors is necessary once the user 602 wants to get access to a restricted area by using the SonoBeacon Application are obviously included in the present invention.

In a first step, the audio signal transmitter 606 such as e.g. a loudspeaker on the user's 602 mobile device 604 transmits an encoded and modulated audio signal 608 which is received by the audio signal receiver 610 of a SonoBeacon device 612. The audio signal 608 comprises both a timestamp and identification information unambiguously identifying the user 604 as a user having the right to access a restricted area such as e.g. the restricted boarding area at an airport. In the example illustrated in FIG. 6, the SonoBeacon Application on the user's 602 mobile device 604 extracts said information about granting the user 602 access to the boarding area e.g. from an electronic flight ticket 614 stored on the user's 602 mobile device 604 which unambiguously identifies the user as a passenger of a specific flight. The signal processing component of the SonoBeacon device 612 processes the audio signal 608 in such a way that the SonoBeacon software component is finally able to determine that the audio signal 608 has been received at a specific time from the mobile device 604 of a user 602 who is listed as a passenger of a specific flight which is boarded from the respective restricted boarding area.

In response to receiving said audio signal 608, the SonoBeacon device 612 may trigger an electronic gate 616 to open automatically for a limited timeslot, such as e.g. for 10 seconds starting from the time specified in the timestamp of the audio signal 608. Obviously, any other random timeslot can be selected by an owner of the SonoBeacon device 612 such as e.g. an airline in the present example. Hereby, the SonoBeacon device 612 can be a separate entity or be physically connected to the electronic gate 616. Subsequently, user 602, who has been authenticated as a passenger of a specific flight, is allowed to pass the electronic gate 616 for entering in the restricted boarding area within the specified timeslot.

Additionally, a signal transmitter 618 of the SonoBeacon device 612 may also broadcast an encoded and modulated audio signal 620 to an audio signal receiver 622 of the user's 602 mobile device 604, notifying a user 602 that he or she has been successfully identified as a passenger of a specific flight and is now allowed to access the restricted boarding area. Hereby, after performing the steps of demodulating and decoding and identifying the corresponding content linked to the watermark and the triggering command included in the encoded and modulated audio signal 620, a pop-up message 624 may be displayed on the display 626 of the user's 602 mobile device 604, which might be additionally accompanied by a sound or light effect.

From the forgoing and further it will be appreciated that, although specific embodiments have been described herein for purposes of illustration, various modifications may be made without deviating from the scope of the present disclosure. For example, the methods, techniques, computer-readable medium, and systems for providing dynamic context-sensitive customized additional content by broadcasting audio signals discussed herein are applicable to other architectures and other system architectures depicted. Also, the methods, techniques, computer program products, and systems discussed herein are applicable to differing protocols, communication media (optical, wireless, cable, etc.) and devices (such as wireless handset, electronic organizers, personal digital assistants, portable email machines, game machines, pagers, navigating devices such as GPS receivers etc.).

The invention claimed is:

1. A computer-implemented method for dynamically providing context related additional content to a mobile device (108) by broadcasting audio signals by a computing device, the method comprising:
   providing the additional content in databases on a server device, in which each specific piece of content is mapped to a specific watermark and/or a specific event is mapped to a triggering command;
   accessing, by the computing device, the server device via a wireless network and extracting a specific watermark and/or triggering command from databases;
   encoding, by the computing device, said specific watermark and/or triggering command into a digital signal;
   selecting, by the computing device, an exactly defined frequency range based on continuously scanning noise signals present in the surrounding environment of the computing device and modulating, by the computing device, the digital signal into an audio signal in the selected exactly defined frequency range;
   transmitting, by the computing device, a command to switch on an audio signal receiver of the mobile device and transmitting information about the selected frequency range from the computing device to the mobile device via the wireless network;
   in response to receiving said command and said information at the mobile device over the wireless network, switching on, by the mobile device, the audio signal receiver of the mobile device and tuning the audio signal receiver to the selected frequency range;
   broadcasting, by the computing device, said audio signal and receiving said audio signal at the mobile device;
   demodulating and decoding, at the mobile device, said audio signal in order to derive the specific watermark and/or triggering command;
   searching, by the mobile device, databases via the wireless network in order to determine the specific content and/or specific event related to the derived specific watermark and/or triggering command;
   displaying and/or rendering said specific content and/or specific event on the mobile device.

2. The computer-implemented method of claim 1, wherein the audio signals may be broadcasted by the computing device in the ultrasound and/or infrasound frequency range.

3. The computer-implemented method of claim 1, wherein the audio signal receiver of the mobile device is already switched on and the information about the selected frequency range is transmitted by an acoustic broadband signal from the computing device to the mobile device.

4. The computer-implemented method of claim 1, wherein any encoded and modulated audio signals are processed on the mobile device in response to receiving a triggering signal.

5. The computer-implemented method of claim 1, further comprising providing
context-related additional content from the mobile device to the computing device by broadcasting audio signals from the mobile device to the computing device, wherein the audio signals comprise a timestamp.

6. The computer-implemented method of claim 1, wherein the computing device and the mobile device are further equipped with at least one of global navigation satellite system receivers and optical sensors.

7. The computer-implemented method of claim 1, further comprising:
extracting, by the mobile device, a triggering command from the received audio signal which triggers retrieving all relevant context-related additional content from the databases on the server device via the wireless network;
caching said retrieved relevant context-related additional content on the mobile devices;
tracking the location of the mobile device; displaying or rendering context-related additional content on the mobile device based on the location information of the mobile device.

8. The computer-implemented method of claim 1, further comprising:
encoding, by the computing device, a same watermark together with different triggering commands triggering different specific events occurring while a similar context-related content is displayed or rendered on the mobile device) and/or encoding, by the computing device, a same triggering command together with different watermarks leading to a similar or same event to be triggered together with completely different context-related content being displayed or rendered on the mobile device.

9. The computer-implemented method of claim 1, wherein encoding, by the computing device, said specific watermark and/or triggering command into a digital signal is performed using error correcting coding and wherein a bit length corresponding to the data part of the signal and a bit length of a shared key change dynamically and wherein additionally a seed for generating the shared key is permuted regularly.

10. The computer-implemented method of claim 1, wherein the mapping of each specific piece of content to a specific watermark and/or of each specific event to a triggering command is changed automatically on a regular basis.

11. The computer-implemented method of claim 1, wherein additionally user specific parameters are taken into account when providing context-related content.

12. A non-transitory computer-readable medium having stored thereon computer-readable instructions that, when run on a computer, are configured for performing the method of claim 1.

13. A computer-implemented method for dynamically providing context-related additional content to a mobile device by broadcasting audio signals by a computing device in the infrasound frequency range, the method comprising:
providing the additional content in a databases on a server device, in which each specific piece of content mapped to a specific watermark and/or a specific event is mapped to a triggering command;
accessing, by the computing device, the server device via a wireless network and extracting a specific watermark and/or triggering command from databases;
encoding, by the computing device, said specific watermark and/or triggering command into a digital signal;
modulating, by the computing device, the digital signal into an audio signal in the infrasound frequency range;
transmitting, by the computing device, a command to switch on a gyrosensor of the mobile device via the wireless network;
in response to receiving said command over the wireless network at the mobile device, switching on the gyrosensor of the mobile device;
broadcasting, by the computing device, said infrasound audio signal and receiving said infrasound audio signal at the gyrosensor of the mobile device;
demodulating and decoding, at the mobile device, said infrasound audio signal in order to derive the specific watermark and/or triggering command;
searching, by the mobile device, databases via the wireless network in order to determine the specific content and/or specific event related to the derived specific watermark and/or triggering command;
displaying and/or rendering said specific content and/or specific event on the mobile device.

14. A computer-implemented system for dynamically providing context-related additional content from a computing device to a mobile device by broadcasting audio signals by the computing device, the system comprising:
a server device comprising databases providing the context-related additional content, in which a specific piece of content is mapped to a specific watermark and/or a specific event is mapped to a triggering command;
the computing device comprising at least the following components:
a software component configured to access the databases on the server device and to extract a specific watermark and/or triggering command;
a signal processing component configured to perform the steps of: encoding the specific watermark and/or triggering command into a digital signal and to modulate the digital signal into an audio signal in a frequency range; and
an audio signal transmitter configured to broadcast the audio signal;
a wireless network connecting the computing device, the mobile device, and the server device configured for accessing the database and for transmitting a command to switch on a receiver or a sensor of the mobile device;
the mobile device comprising at least the following components:
a receiver or sensor configured to receive the audio signal broadcasted by the audio signal transmitter of the computing device;
a signal processing component configured to perform the steps of: demodulating and decoding the received audio signal in order to derive the specific watermark and/or triggering command;
an application configured to perform the steps of:
searching the databases in order to determine the specific content and/or specific event related to the derived specific watermark and/or triggering command;

displaying and/or rendering said specific content and/or specific event on a display of the mobile device.

15. The computer-implemented system as claim 14 recites, wherein:
the signal processing component of the computing device is configured to select an exactly defined frequency range based on continuously scanning noise signals present in the surrounding environment of the computing device, wherein the modulating of the digital signal into the audio signal includes modulating in the selected exactly defined frequency range;
the command to switch on the receiver or the sensor includes a command to switch on an audio signal receiver of the mobile device and a command to transmit information about the selected frequency range from the computing device to the mobile device;
the receiver or sensor of the mobile device includes an audio signal receiver configured to receive the audio signal broadcasted by the audio signal transmitter of the computing device; and
the signal processing component of the mobile device is configured to perform the further step of tuning the audio signal receiver of the mobile device to the selected frequency range.

16. The computer-implemented system as claim 14 recites:
the computing device broadcasting audio signals in the infrasound frequency range;
the signal processing component of the computing device modulating said digital signal into the audio signal in the infrasound frequency range; and
the audio signal transmitter configured to broadcast said audio signal in the infrasound frequency range;
the command to switch on the receiver or the sensor being to switch on a gyrosensor of the mobile device; and
the receiver or sensor of the mobile device including a gyro sensor configured to receive said infrasound audio signal broadcasted by the audio signal transmitter of the computing device.

* * * * *